US005707713A

United States Patent [19]

Langan et al.

[11] Patent Number: 5,707,713

[45] Date of Patent: Jan. 13, 1998

[54] VARIABLE DOUBLE SIDED LINERLESS LABELS

[75] Inventors: Joseph W. Langan, Cheektowaga; Francis R. Smith, North Tonawanda Erie, both of N.Y.

[73] Assignee: Moore Business Forms, Inc., Grand Island, N.Y.

[21] Appl. No.: 604,441

[22] Filed: Feb. 21, 1996

[51] Int. Cl.[6] .......... B32B 3/00

[52] U.S. Cl. .......... 428/195; 428/174; 428/212; 428/411.1; 428/488.4; 428/913; 283/81

[58] Field of Search .......... 428/195, 411.1, 428/500, 488.4, 914, 174, 212, 913; 283/81

[56] References Cited

U.S. PATENT DOCUMENTS

| | | | |
|---|---|---|---|
| 3,203,823 | 8/1965 | Grimes . | |
| 3,312,005 | 4/1967 | McElroy . | |
| 4,460,634 | 7/1984 | Hasegawa . | |
| 4,522,870 | 6/1985 | Esmay . | |
| 4,666,185 | 5/1987 | Piborough | 283/80 |
| 4,696,843 | 9/1987 | Schmidt | 428/41 |
| 5,021,110 | 6/1991 | Kobayashi . | |
| 5,143,466 | 9/1992 | Baldwin et al. . | |
| 5,292,713 | 3/1994 | Stenzel et al. . | |
| 5,324,078 | 6/1994 | Bane . | |
| 5,336,541 | 8/1994 | Kobayashi . | |
| 5,599,602 | 2/1997 | Leonard et al. | 428/56 |

FOREIGN PATENT DOCUMENTS

| | | |
|---|---|---|
| 0579423 | 1/1994 | European Pat. Off. . |
| 0605126 | 7/1994 | European Pat. Off. . |
| WO 81/00309 | 2/1981 | WIPO . |

*Primary Examiner*—William Krynski
*Attorney, Agent, or Firm*—Nixon & Vanderhye

[57] ABSTRACT

An advantageous linerless label assembly is produced by substantially full face coating a first substrate web second face with a first pressure sensitive adhesive, and substantially full face coating a second substrate web first face with a second pressure sensitive adhesive that is physically or chemically incompatible with the first adhesive, and then bringing the first and second adhesives into direct contact with each other. The substrates are formed into discrete separable labels which may be in sheet, roll, or fan-fold configuration. The individual labels in the substrate can either have the leading edges of each aligned with each other, or the leading edges can be spaced from each other (e.g. about half the length of each of the labels). When physically incompatible adhesives are used, the first adhesive may be vegetable based, polyvinyl alcohol or ultraviolet reactivated adhesive, and the second acrylic. When chemically incompatible adhesives are utilized, the first may be an acrylate adhesive and the second a copolymer of that acrylate adhesive and acrylonitrile.

20 Claims, 2 Drawing Sheets

VARIABLE DOUBLE SIDED LINERLESS LABELS

BACKGROUND AND SUMMARY OF THE INVENTION

Linerless label products are becoming increasing more popular because of environmental and other advantages associated therewith because they eliminate the need for a release sheet. Typically linerless labels are manufactured in a roll configuration where an adhesive is applied to one side of a continuous web and a release coating applied to the other, such as in U.S. Pat. Nos. 5,292,713 and 5,324,078.

Sometimes linered labels are supplied in a configuration where there is essentially a double thickness of the linered labels, linered labels being provided on opposite sides of a release sheet, such as shown in U.S. Pat. No. 5,143,466. The same general type of configuration has been provided for linerless labels, such shown in U.S. Pat. Nos. 5,336,541 and 3,312,005, however in those situations alternating strips of adhesive and release coating are necessary requiring use of release material and resulting in only approximately 50% adhesive coverage on each of the individual labels.

According to the present invention a linerless label assembly, and method of manufacturing linerless labels, are provided which have all of the advantages associated with the linerless labels of U.S. Pat. No. 5,336,541 (being linerless, not requiring a release coating on the face opposite the substrate, and providing a double thickness of labels) while having the additional advantages of not requiring any release coating at all, and substantially full coverage of adhesive on each of the labels. The term "substantially full coverage" as used in the present specification and claims means that alternating strips and release coatings are not required and typically at least about 80% adhesive coverage is provided (except for very speciality uses such as where a nonadhesive tab on the label is designed to be detached from the label). The label assembly according to the present invention requires no release coatings of any kind but rather face-to-face labels are separated from engagement with each other merely because of incompatibilities between the adhesives on the labels that are in contact with each other.

The labels produced according to the present invention thus may be less expensive to produce than other linerless labels performing the same basic function (such as in U.S. Pat. No. 5,336,541) while providing better adhesive holding properties when applied to a package or product with which the label is designed to be ultimately used, while eliminating the expense and environmental problems associated with release (e.g. silicone) liners. The labels according to the present invention are compatible with conventional intelligent imaging equipment and, therefore, may be readily printed or otherwise imaged. Since there is no release coat on the face thereof to be imaged, each of the labels may be readily printed or otherwise imaged with a wide variety of different equipment and at almost any point in the manufacturing—application procedure. Also, the assemblies according to the present invention may be in a wide variety of configurations including roll form (continuous), sheets, or fanfold.

According to one aspect of the invention a linerless label assembly is provided comprising the following: A first linerless label comprising a substrate (e.g. paper) having first and second faces, and a substantially full coverage first adhesive on the second face thereof. A second linerless label comprising a substrate (e.g. paper) having first and second faces, and a substantially full coverage second adhesive on the first face thereof. The first and second adhesives being physically or chemically incompatible with each other so that they can be separated from each other without significant damage to the substrates or the adhesives, the first adhesive having a much higher affinity for the first substrate than for the second adhesive, and the second adhesive having a much higher affinity for the second substrate than for the first adhesive. And the first label second face in separable face-to-face engagement with at least about 50% of the second label first face so that the first and second adhesives are in direct engagement with each other.

The first and second adhesives both comprise pressure sensitive adhesive. The first substrate first face and second substrate second face are typically uncoated (they need not be coated for adhesive release properties, but may be coated to provide longer life in use, or for other purposes) and having indicia thereon. The indicia may be applied at any time during the process of producing labels. The first and second adhesives may be chemically incompatible. Examples of chemically incompatible adhesives are a first adhesive of isooctylacrylate and a second adhesive of a copolymer of isooctylacrylate and acrylonitrile, and a first adhesive of isodecylacrylate and a second adhesive of a copolymer of isodecylacrylate and acrylonitrile, and a first adhesive of ethylhexylacrylate and a second adhesive of a copolymer of ethylhexylacrylate and acrylonitrile, although there are a variety of other known and to be developed chemically incompatible adhesives that may be effectively utilized.

Where the first and second adhesives are physically incompatible, the second adhesive may be acrylic, and the first adhesive may be a vegetable based, polyvinyl alcohol, rubber based, protein based, or ultraviolet reactivated adhesive. Other existing or to be developed physically incompatible adhesives may also be utilized.

According to another aspect of the present invention a linerless label assembly is provided comprising the following: A first web or sheet comprising a plurality of individual linerless labels each having first and second faces and a substantially full coverage first pressure sensitive adhesive on the second face. A second web or sheet comprising a plurality of individual linerless labels having first and second faces and a substantially full coverage second pressure sensitive adhesive on the first face. And the first and second adhesives being physically or chemically incompatible with each other, and in direct engagement with each other so that the first and second webs or sheets are releasably connected to each other.

A wide variety of configurations of the label assembly may be provided. Typically each of the individual linerless labels has a leading edge, and the first web or sheet label leading edges may be in alignment with the second web or sheet individual linerless labels leading edges; or the leading edges of the respective webs or sheets may be spaced from each other (e.g. about one-half the length of the majority of the labels of each of the web or sheet). The first and second adhesives may specifically be as described above. The assembly may be in roll, sheet, or fanfold configuration.

According to another aspect of the present invention a method of manufacturing a linerless label assembly utilizing a first substrate web (e.g. paper) having first and second faces, and a second substrate web (e.g. paper or synthetic sheet) having first and second faces, is provided. The method comprises the following steps: (a) Substantially full face coating the first substrate web second face with a first adhesive. (b) Substantially full face coating the second substrate web first face with a second adhesive that is physically or chemically incompatible with the first adhesive. (c) Bringing the first adhesive on the first substrate second face into direct contact with the second adhesive on the second substrate first face. And (d) forming the substrates into discrete separable labels.

Steps (a) and (b) are typically practiced by coating both the substrate faces with pressure sensitive adhesives, such as the physically or chemically incompatible adhesives described above. There may be the further step of forming the substrates of discrete labels into a configuration of a roll, individual sheets with a plurality of labels from each substrate in each sheet, or a fanfold configuration. Step (d) may be practiced before or after step (c), or parts of step (d) practiced both before and after step (c). Imaging may be practiced at any time during manufacture, or at any time before (or after) application of the final labels to the surfaces on which they are to be ultimately applied. Because the first substrate web and the second substrate web second face may be devoid of adhesive release coat material, effective and versatile imaging is simple and easy to accomplish.

It is a primary object of the present invention to provide a highly advantageous linerless label assembly, having all of the advantages of conventional linerless label assemblies as well as other advantages. This and other objects of the invention will become clear from an inspection of the detailed description of the invention and from the appended claims.

DETAILED DESCRIPTION OF THE DRAWINGS

Figure 1:
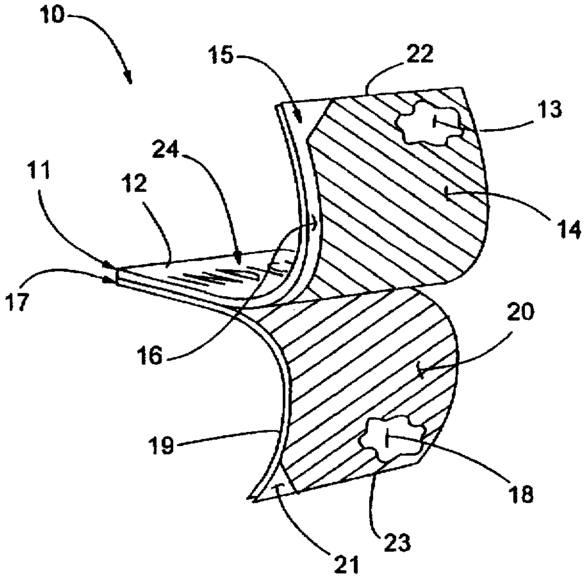
FIG. 1 is a front perspective schematic view showing two linerless labels of a linerless label assembly according to the present invention with the leading edges thereof peeled back for clarity of illustration.

FIG. 1 shows a linerless label assembly 10 according to the present invention in its simplest form, merely comprising two linerless labels in face-to-face engagement, FIG. 1 illustrating the labels as they are being pulled apart. The first label 11 comprises a substrate (such as paper, although any other suitable label substrate material may be utilized) having a first face 12 and a second face 13. The second face 13 has a substantially full coverage first pressure sensitive adhesive 14 thereon. By substantially full coverage it is meant that the adhesive 14 is substantially continuous, rather than being applied in strips, and typically covers at least about 80% of the face 13 (except for speciality applications such as where a nonadhesive tab is designed to be separated from the label 11). While the first adhesive 14 typically covers at least 90% of the face 13 and may cover 100%, it need not cover 100% and in some circumstances it is desirable that it not cover 100% of the face 13. In the embodiment illustrated in FIG. 1 there is corner 15 and a side strip 16 of face 13 that are both uncovered by the first pressure sensitive adhesive 14.

FIG. 1 also shows the second linerless label 17 having a first face 18 and a second face 19 (only the edge of which is visible in FIG. 1). On the first face 18 is a substantially full coverage second pressure sensitive adhesive 20. In the embodiment illustrated the second adhesive 20 covers more than 90% of the face 18, but a corner 21—in alignment with the corner 15—is left uncovered.

The labels 11, 17 each have a leading edge, 22, 23 respectively. In those circumstances where leading edges 22, 23 are in alignment with each other (as in FIG. 1), it may be desirable to provide the adhesive-free corners 15, 21 to facilitate separation between the labels 11, 17 since even though the adhesives 14, 20 are incompatible (as will be hereafter more fully explained) they have a certain tackiness which tends to hold them together.

The adhesives 14, 20 are incompatible with each other. The adhesive 14 has a much higher affinity for the face 13 (or to a tie coat on the face 13 for facilitating adherence of the adhesive 14 thereto) than it does for the second adhesive 20, while the second adhesive 20 has a much higher affinity for the face 18 (or a tie coat thereon) than it does for the first adhesive 14. Even though the adhesives 14, 20 are incompatible, since they are pressure sensitive adhesive they have a certain tack, and will normally be held in face-to-face engagement until a force is applied thereto to separate them. However, when they separate they separate cleanly, without any destruction of the substrates of the labels 11, 17, and without any significant amount of adhesive from one label separating with the other.

While a wide variety of incompatible properties may be employed for the adhesives 14, 20 of the label assembly 10, preferably the adhesives 14, 20 are either physically or chemically incompatible. While a wide variety of different physically incompatible adhesives, now existing or to be developed, may be employed, some specific examples are acrylic adhesive as the second adhesive 20, and vegetable based adhesive, or a polyvinyl alcohol adhesive, or a rubber based adhesive, or a protein based adhesive, or an ultraviolet reactivated adhesive (that is adhesive that becomes tacky when exposed to ultraviolet light) as the first adhesive 14 (or vice versa).

While a wide variety of chemically incompatible adhesives may also be utilized (presently existing or to be developed), some suitable examples are isooctylacrylate as the first adhesive 14 and a copolymer of isooctylacrylate and acrylonitrile as the second adhesive 20; isodecylacrylate as the first adhesive 14 and a copolymer of isodecylacrylate and acrylonitrile as the second adhesive 20; and ethylhexylacrylate as the first adhesive 14 and a copolymer of ethylhexylacrylate and acrylonitrile as the second adhesive 20. That is in general an acrylate adhesive and a copolymer of that adhesive, and acrylonitrile may comprise the incompatible adhesives.

The first face 12 of the first label substrate 11, and the second face 19 of the second label substrate 17 typically will have indicia applied thereon at some point during the manufacturing process, or certainly before actual application to a surface (e.g. package, container, or the like) to which the label 11, 17 is ultimately applied. FIG. 1 schematically illustrates indicia 24 which has been printed or otherwise imaged on the face 12, it being understood that such indicia 24 also is at some point provided on the face 19 too.

Utilizing the basic label assembly 10 according to the present invention, almost any configuration can be provided.

Figure 2:
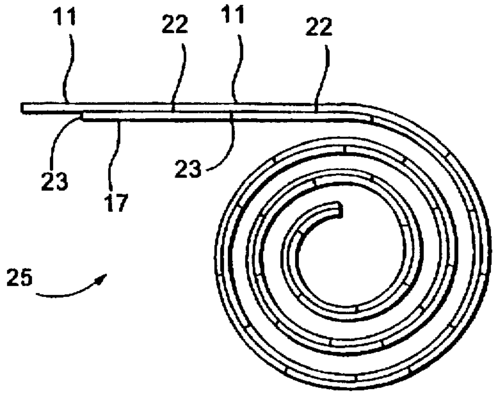
FIG. 2 is a side view of a linerless label assembly according to the present invention where the labels are in roll configuration.

For example, as illustrated in FIG. 2 a roll configuration 25 is provided. In the roll configuration 25 illustrated in FIG. 2 note that the leading edges 22, 23 of the labels 11, 17 are spaced from each other. In this embodiment the labels 11, 17 have the same length as each other, and the leading edges 22, 23 are typically at about the midpoint of the length of the opposite label 17, 11. However, the labels 11, 17 could have different lengths with the leading edges 22, 23 then inherently and appropriately scattered, or the leading edges 22, 23 may be aligned (especially where there is not 100% coverage of the faces 13, 18 by the adhesives 14, 20, respectively, but rather elements such as the nonadhesive corners 15, 21 are provided). Also, each of the labels 11 may be separated from other labels 11 (that is, at the leading edges 22 thereof) by perforations or other lines of weakness, rather than clean die cuts such as illustrated at 22 in FIG. 1. Of course, the leading edges 23 also may be perforations or lines of weakness rather than die cuts too.

Figure 3:
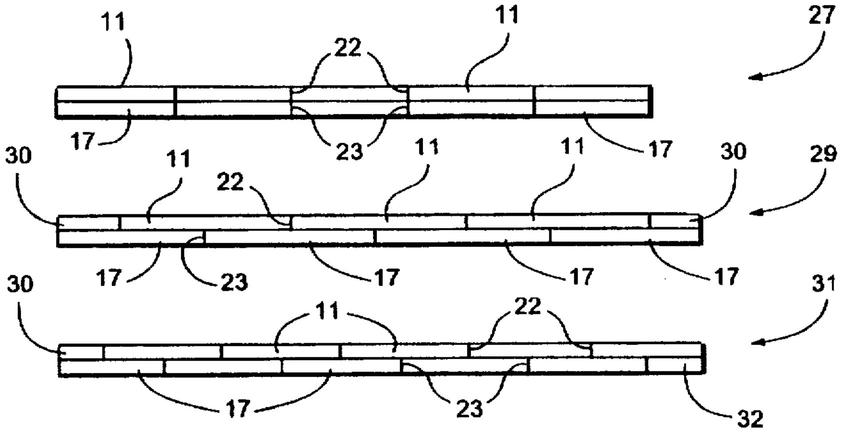
FIG. 3 is an exploded side view of a stack of linerless label assemblies according to the present invention illustrating three different sheets of labels comprising the stack.

FIG. 3 illustrates label assemblies according to the present invention in sheet form in an exploded stack. In the configuration 27 the leading edges 22, 23 of the labels 11, 17 are aligned with each other. In this configuration the leading edges 22, 23 typically would be lines of weakness rather than die cuts, although instead the labels 11 may be tied together along one or both side edges thereof by tie strips having line of weakness interfaces with the labels 11, and/or by similar tie strips for the labels 17.

The sheet 29 in FIG. 3 has the leading edges 22, 23 of the labels 11, 17 offset from each other. Depending upon the lengths of the labels 11, 17 the end edges of the label assembly of the sheet 29 may be in alignment with each other, or instead—as illustrated in association with the labels 11 in FIG. 3—smaller size labels 30 are provided at the ends of the labels 11. The smaller size labels 30 may actually be used as labels, or may be discarded.

The label assembly 31 of FIGURE shows a sheet in which the labels 11, 17 are the same length, with small labels 30 being provided in association with the labels 11 at one end of the assembly/sheet 31, while smaller labels 32 are provided in association with the labels 17 at the opposite end of the assembly/sheet 31.

Figure 4:
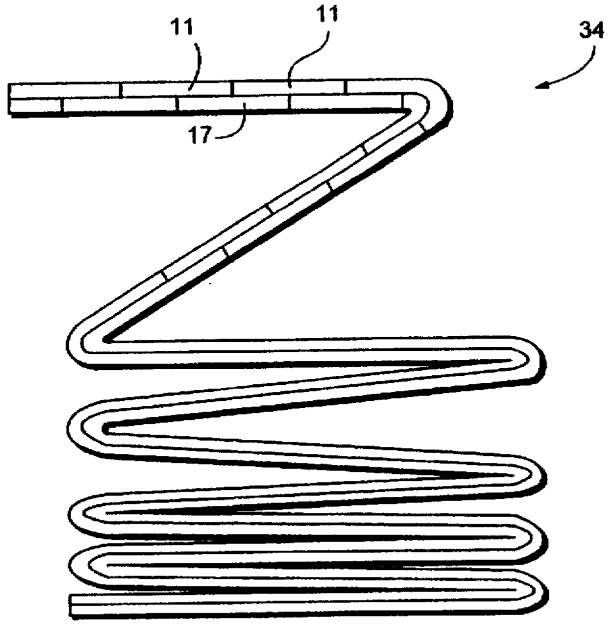
FIG. 4 is a view like that of FIG. 2 only showing the linerless labels in fanfold configuration.
Figure 5:
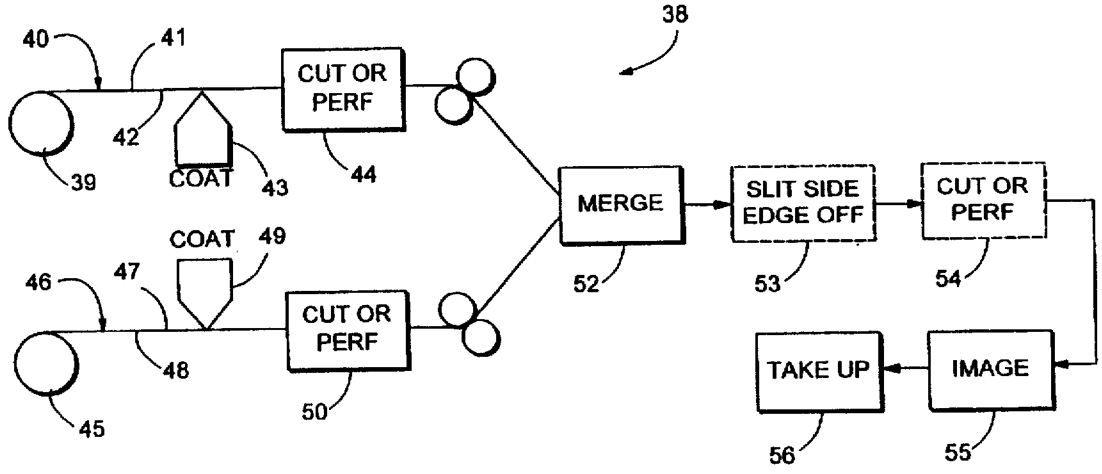
FIG. 5 is a schematic view illustrating a method of manufacture of linerless label assemblies according to the present invention.

FIG. 4 schematically illustrates a fanfold configuration 34 of labels 11, 17 of an assembly according to the present invention. In FIG. 4 the labels 11, 17 are shown as offset from each other (the leading edges 22, 23 spaced from each other) typically with the fanfolding being provided at one of the leading edges 22, 23. However, other configurations are also possible. FIG. 5 schematically illustrates exemplary apparatus 38 that may be utilized in the manufacture of linerless label assemblies according to the present invention. Reference numeral 39 illustrates a roll of a substrate material web 40, typically paper, having a first face 41 and a second face 42. The face 42 is coated with a pressure sensitive first adhesive (e.g. 14) as indicated by coating station 43. The coating station 43 may comprise a full face coater, applying adhesive to the entire face 42, or the coater 43 may comprise a spot coater which does not apply adhesive at certain points merely to facilitate slitting of the web 40 along the width thereof into individual label assembly lengths, or to provide portions such as illustrated at 15, 21 in FIG. 1, etc. At least about 80% of the surface 42 is typically coated with the first adhesive by the coater 43. After coating at 43 (or even before coating at 43) the web 40 may be perfed or cut (as long as integral portions of the web 40 are still provided) into the basic form of individual labels, utilizing conventional equipment.

A source of substrate is illustrated at 45 in FIG. 5, the web 46 also typically being paper or other conventional label substrate, and having first and second faces 47, 48, respectively. The first face 47 is typically coated with a second pressure sensitive adhesive (e.g. 20) by the conventional coating equipment 49 which may be the same as the equipment 43. Conventional cut or perfing is also provided as indicated at 50 either before or after the coater 49.

The webs 40, 46 need not be coated on the faces 41, 48 thereof with any material. There is no necessity of coating faces 41, 48 with adhesive release material, and if they are coated with any other material it is for purposes other than adhesive release (such as for protecting the label during use or the like).

After passing coating stations 43, 49 (and once the adhesives 14, 20 have dried) the webs 40, 46 are merged—as illustrated schematically at 52 in FIG. 5—utilizing conventional equipment so that the adhesive coated faces 42, 47 come into face-to-face direct engagement with each other (i.e. the adhesives 14, 20 are in direct contact with each other). Downstream of the merging 52 cut or petting action for forming individual labels may be practiced. For example, if the equipment 44, 50 only partially forms the webs 40, 46 into individual labels (for example by cross cutting, or cross perfing), then conventional slitting equipment—as illustrated schematically at 53—in FIG. 5 may be utilized to form the final labels, e.g. by slitting off side edges from the webs 40, 46 (and also perhaps by slitting the webs 40, 46 into distinct strips of labels so that a plurality are provided along the width of the webs 40, 46). Alternatively to equipment 44, 50, 53 conventional cut or perf equipment 54 may be provided downstream of the merge equipment 52 for forming the webs 40, 46 into individual labels at that time. That is, the formation of the webs 40, 46 into individual labels may take place prior to merging at 52, after merging at 52, or parts both before and after merging at 52.

The web 40, 46 faces 41, 48 may be imaged at any time during production (and indeed the faces 42, 47 may also be imaged prior to the adhesive application where the adhesive is designed to be applied to a transparent surface or the like). Because the faces 41, 48 typically are not coated with adhesive release material, or any other material, they may be imaged utilizing virtually any type of conventional printing or other type of imaging equipment and at high speed. Exemplary types of conventional printers that may be used for both individual sheet or continuous products are Dot Matrix, Direct Thermal, Thermal Transfer, Laser Ink Jet and Digital Color. For example, imaging may take place as illustrated schematically at 55 in FIG. 5, the faces 41, 48 being imaged substantially simultaneously. The equipment 55 typically applies indicia such as schematically illustrate at 24 in FIG. 1.

Ultimately, the label assemblies according to the present invention, produced utilizing the equipment 38, are taken up as illustrated schematically at 56 in FIG. 5. The takeup 56 may be a conventional rolling station in order to form rolls such as illustrated at 25 in FIG. 2, or may be conventional sheeting equipment (for example, bursting or cutting the webs 40/46 into sheets such as 27, 29, 31 as seen in FIG. 3), or conventional fanfolding equipment (e.g. to produce a configuration 34 illustrated in FIG. 4).

It will thus be seen that according to the present invention an advantageous linerless label assembly, and method of manufacturing a linerless label assembly, have been provided. The label assembly according to the present invention is simpler and less expensive to make than many conventional linerless labels, yet has the environmental friendliness associated therewith. Also, it has substantially full adhesive coverage of each of the labels, which is advantageous in numerous circumstances.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and processes.

What is claimed is:

1. A linerless label assembly comprising:

a first linerless label comprising a substrate having first and second faces, and a substantially full coverage first pressure-sensitive adhesive on said second face thereof;

a second linerless label comprising a substrate having first and second faces, and a substantially full coverage second pressure-sensitive adhesive on said first face thereof;

said first and second adhesives being physically or chemically incompatible with each other so that they can be separated from each other without significant damage to said substrates or said adhesives; and said first label second face in separable face-to-face engagement with at least about 50% of said second label first face so that said first and second adhesives are in direct engagement with each other.

2. An assembly as recited in claim 1 wherein said first and second adhesives both comprise pressure sensitive adhesives, and further comprising indicia on uncoated said first substrate first face and second substrate second face.

3. An assembly as recited in claim 2 wherein said first and second adhesives are physically incompatible.

4. An assembly as recited in claim 3 wherein said first adhesive comprising vegetable based adhesive, polyvinyl alcohol adhesive, rubber based adhesive, protein based adhesive, or adhesive that becomes tacky when exposed to ultraviolet light, and said second adhesive comprising acrylic adhesive.

5. An assembly as recited in claim 2 wherein said first and second adhesives are physically incompatible, said first adhesive comprising vegetable based adhesive, polyvinyl alcohol adhesive, rubber based adhesive, protein based adhesive, or adhesive that becomes tacky when exposed to ultraviolet light, and said second adhesive comprising acrylic adhesive.

6. An assembly as recited in claim 2 wherein said first and second adhesives are chemically incompatible, said first adhesive comprising an acrylate adhesive and said second adhesive comprising a copolymer of said acrylate adhesive and acrylonitrile.

7. An assembly as recited in claim 1 wherein said first and second adhesives are chemically incompatible pressure sensitive adhesives.

8. An assembly as recited in claim 7 wherein said first adhesive comprises isooctylacrylate, and said second adhesive comprises a copolymer of isooctylacrylate and acrylonitrile.

9. An assembly as recited in claim 7 wherein said first adhesive comprises isodecylacrylate and said second adhesive comprises a copolymer of isodecylacrylate and acrylonitrile.

10. An assembly as recited in claim 7 wherein said first adhesive comprises ethylhexylacrylate and said second adhesive comprises a copolymer of ethylhexylacrylate and acrylonitrile.

11. A linerless label assembly comprising:

a first web or sheet comprising a plurality of individual linerless labels each having first and second faces and a substantially full coverage first pressure sensitive adhesive on said second face;

a second web or sheet comprising a plurality of individual linerless labels having first and second faces and a substantially full coverage second pressure sensitive adhesive on said first face; and said first and second adhesives being physically or chemically incompatible with each other, and in direct engagement with each other.

12. An assembly as recited in claim 11 wherein said individual linerless labels each have a leading edge; and wherein the leading edges of the labels from said first web or sheet are substantially in alignment with the leading edges of the labels from said second web or sheet.

13. An assembly as recited in claim 12 wherein said first and second adhesives are physically incompatible, said first adhesive comprising vegetable based adhesive, polyvinyl alcohol adhesive, rubber based adhesive, protein based adhesive, or adhesive that becomes tacky when exposed to ultraviolet light, and said second adhesive comprising acrylic adhesive.

14. An assembly as recited in claim 12 wherein said first and second adhesives are chemically incompatible, said first adhesive comprising an acrylate adhesive and said second adhesive comprising a copolymer of said acrylate adhesive and acrylonitrile.

15. An assembly as recited in claim 11 wherein the individual linerless labels each have a leading edge; and wherein the leading edges of the labels of said first web or sheet are spaced from the leading edges of the individual labels from the second web or sheet.

16. An assembly as recited in claim 15 wherein most of the individual linerless labels of said first web or sheet have approximately the same length as most of the individual linerless labels from said second web or sheet; and wherein said leading edges of said individual linerless labels from said first web or sheet are spaced from the leading edges of said individual linerless labels of said second web or sheet a distance approximately equal to said first length.

17. An assembly as recited in claim 16 wherein said first and second adhesives are physically incompatible, said first adhesive comprising vegetable based adhesive, polyvinyl alcohol adhesive, rubber based adhesive, protein based adhesive, or adhesive that becomes tacky when exposed to ultraviolet light, and said second adhesive comprising acrylic adhesive.

18. An assembly as recited in claim 16 wherein said first and second adhesives are chemically incompatible, said first adhesive comprising an acrylate adhesive and said second adhesive comprising a copolymer of said acrylate adhesive and acrylonitrile.

19. An assembly as recited in claim 11 wherein said first and second adhesives are physically incompatible, said first adhesive comprising vegetable based adhesive, polyvinyl alcohol adhesive, rubber based adhesive, protein based adhesive, or adhesive that becomes tacky when exposed to ultraviolet light, and said second adhesive comprising acrylic adhesive.

20. An assembly as recited in claim 11 wherein said first and second adhesives are chemically incompatible, said first adhesive comprising an acrylate adhesive and said second adhesive comprising a copolymer of said acrylate adhesive and acrylonitrile.

* * * * *